(12) United States Patent
Malleck

(10) Patent No.: US 8,196,988 B1
(45) Date of Patent: Jun. 12, 2012

(54) TOOLBOX CAMPER

(76) Inventor: Roxann Malleck, Auroa, NE (US)

( * ) Notice: Subject to any disclaimer, the term of this patent is extended or adjusted under 35 U.S.C. 154(b) by 181 days.

(21) Appl. No.: 12/852,034

(22) Filed: Aug. 6, 2010

Related U.S. Application Data

(60) Provisional application No. 61/273,470, filed on Aug. 6, 2009.

(51) Int. Cl.
*B60R 9/00* (2006.01)

(52) U.S. Cl. ....... 296/37.6; 296/164; 296/168; 296/173; 224/400; 224/403

(58) Field of Classification Search ................. 296/156, 296/164, 165, 168, 173, 37.1, 37.6, 3; 224/281, 224/282, 400, 403–405, 522, 534
See application file for complete search history.

(56) References Cited

U.S. PATENT DOCUMENTS

| | | |
|---|---|---|
| 1,276,388 A | 8/1918 | Marx |
| 2,057,197 A | 10/1936 | Liptay |
| 3,441,101 A * | 4/1969 | Parnell ............................. 180/12 |
| D225,622 S | 12/1972 | Carroll |
| 3,788,670 A | 1/1974 | Petersen |
| 3,823,975 A | 7/1974 | Cooper |
| D243,597 S | 3/1977 | Headington, Jr. |
| 4,079,956 A | 3/1978 | Headington, Jr. |
| 4,194,785 A | 3/1980 | Cox et al. |
| 4,518,189 A * | 5/1985 | Belt ................... 296/22 |
| 4,537,441 A | 8/1985 | McCleary |
| 4,550,946 A * | 11/1985 | Hanemaayer ................. 296/156 |
| 4,685,719 A * | 8/1987 | Hanemaayer ................. 296/156 |
| 5,080,426 A | 1/1992 | Johnson |
| 5,421,042 A * | 6/1995 | Hibschman ....................... 4/617 |
| 5,449,302 A | 9/1995 | Yarbrough et al. |
| 5,810,168 A * | 9/1998 | Eggering ...................... 206/372 |
| 6,263,867 B1 * | 7/2001 | Skelton ......................... 126/37 B |
| 6,814,383 B2 * | 11/2004 | Reed et al. .................... 296/24.3 |
| 6,935,670 B2 * | 8/2005 | Bright .......................... 296/37.6 |
| 7,530,618 B2 * | 5/2009 | Collins et al. ................ 296/37.6 |
| 7,726,719 B1 * | 6/2010 | Barron ......................... 296/37.6 |
| 2005/0016713 A1 * | 1/2005 | Houck et al. .................... 165/42 |
| 2006/0145461 A1 | 7/2006 | Anderson |
| 2007/0262602 A1 | 11/2007 | Nagle |
| 2010/0012165 A1 * | 1/2010 | Bedard ......................... 136/205 |

\* cited by examiner

*Primary Examiner* — Lori Lyjak
(74) *Attorney, Agent, or Firm* — Montgomery Patent & Design, LLC; Robert C. Montgomery; Joseph T. Yaksich

(57) ABSTRACT

A portable multi-functional sleeping system comprising a sleeping platform for one (1) to two (2) people for use while camping or performing a similar activity is herein disclosed. The sleeping system is provided with a trailer for movement or for towing behind a smaller vehicle or motorcycle. A lid folds open and exposes a mattress capable of holding up to two (2) people. The lower portion of the system provides three (3) storage compartments. A first compartment is provided with insulated sidewalls to serve as a cooler to keep food cool. A second compartment is for general storage for clothing and similar items. A third compartment is provided with collapsible poles and hooks for attaching a shower curtain and water bag thereto shower. A cooking grill section is also provided on the back portion of the system that folds up for compact storage.

20 Claims, 7 Drawing Sheets

TOOLBOX CAMPER

RELATED APPLICATIONS

The present invention was first described in and claims the benefit of U.S. Provisional Application No. 61/273,470 filed Aug. 6, 2009, the entire disclosures of which are incorporated herein by reference.

FIELD OF THE INVENTION

The present invention relates generally to portable campers, and in particular, to a towable compact camper for use in conjunction with an existing motor vehicle which provides basic camper functionalities in a compact structure.

BACKGROUND OF THE INVENTION

Camping and other similar outdoors activities are extremely popular the world over. One (1) thing which varies greatly between persons undertaking such pastimes is the level of comfort desired during extended outdoors stays. While some people find it therapeutic to forego creature comforts entirely, many people enjoy having basic amenities such as sleeping surfaces, food preparation surfaces, and on-hand water supplies in an effort to focus on relaxation.

Many methods exist for providing some basic comforts while in extended outdoors excursions. Popular devices include portable charcoal grills and coolers for foodstuffs, tents, air mattresses, or sleeping bags for sleeping surfaces, bottled water supplies, pre-cooked food, and the like. While many people are content with some combination of these amenities, many people prefer legitimate indoors sleeping quarters and proper amenities such as showers and bathrooms due to factors such as medical conditions, small children, time conservation, relaxation, and the like. Such amenities can be provided on camping trips via cabins, recreational vehicles, and the like. However, these methods are often prohibitively expensive or not always available.

Various attempts have been made to provide portable camping or outdoors amenities. Examples of these attempts can be seen by reference to several U.S. patents. U.S. Pat. No. 1,276,388, issued in the name of Marx, describes a wheeled camping trailer particularly adapted to carry beds or bedding materials.

U.S. Pat. No. 3,788,670, issued in the name of Petersen, describes a camping unit attachable to a motorcycle in a manner similar to a sidecar. The Petersen apparatus expands into a tent-like structure which provides a ground cover and sheltering function.

U.S. Pat. No. 4,194,785, issued in the name of Cox et al., describes a camper comprising a pair of boxes mounted on wheels for transport. The boxes contain a variety of collapsed structures which assemble to a large tent structure including various cooking amenities, tabletop surfaces, and the like.

Additionally, ornamental designs for a camping trailer exist, particularly U.S. Pat. Nos. D 225,622 and D 243,597. However, none of these designs are similar to the present invention.

While these devices fulfill their respective, particular objectives, each of these references suffer from one (1) or more of the aforementioned disadvantages. Many such apparatuses are overly cumbersome to transport and, particularly, to assemble. Also, many such apparatuses provide a narrow range of utility such as basic sheltering functions only. Furthermore, many such apparatuses are difficult to transport using smaller vehicles such as motorcycles. In addition, many such apparatuses are not quick to collapse or easy to secure during extended but temporary forays away from the equipment such as hiking during the day. Accordingly, there exists a need for a portable camper apparatus without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide a wide range of portable camping amenities in a manner that is compact, simple, and quick. Thus, the object of the present invention is to solve the aforementioned disadvantages and provide for this need.

To achieve the above objectives, it is an object of the present invention to provide a portable sleeping and storage system for multiple people for use in camping or similar activities. The apparatus comprises trailer and base structures which further comprise camping accessories including a grill, a plurality of storage means, and a shower.

Another object of the present invention is to provide a means to transport the apparatus utilizing an existing motor vehicle such as a truck or a small vehicle such as a motorcycle. The trailer comprises a tongue and a hitch which allow for connection to a conventional hitch portion on an existing vehicle and the base structure comprises wheels.

Yet still another object of the present invention is to comprise dimensions suitable for legal usage on state and local highways and the like.

Yet still another object of the present invention is to enable positioning on the bed of a truck via the base structure. The base structure comprises a shape similar to conventional truck toolboxes and fastening portions for securing the apparatus.

Yet still another object of the present invention is to comprise a plurality of mechanical fasteners which allow a user to selectively secure or remove the trailer from frame support portions of the base structure.

Yet still another object of the present invention is to provide electrical connections between the trailer and vehicle in a conventional manner to allow functioning of the trailer tail lights in a conventional manner.

Yet still another object of the present invention is to provide protection and selectable locking to the interior of the trailer via the lid-like top structure and a corresponding locking mechanism.

Yet still another object of the present invention is to provide a grill which allows a user to cook food utilizing the apparatus. The grill is pivotable along a side surface of the trailer for vertical storage during transport and periods of non-use.

Yet still another object of the present invention is to provide a plurality of attachable bed legs which engage the top surface of the trailer, along the top surface to be hingedly opened and rested upon a ground surface to form a flat horizontal surface with the top of the trailer when open.

Yet still another object of the present invention is to provide a recessed mattress contained within the top surface of the trailer in order to provide a sleeping or sitting surface when the top surface is opened with the bed legs attached.

Yet still another object of the present invention is to comprise a plurality of lidded compartments integral to the trailer which provide features of dry storage, insulated storage, and the like.

Yet still another object of the present invention is to comprise a compartment of collapsible shower. The shower comprises a plurality of collapsible frame portions, a curtain, a drain and other conventional features which provide a user with a means to bathe utilizing the apparatus.

Yet still another object of the present invention is to provide a method of utilizing the device that provides a unique means of obtaining the invention, hitching or attaching it to an existing motor vehicle, towing it to a desired location, detaching the trailer portion, selectively deploying the grill for use, attaching the bed legs, opening the top structure to provide a sleeping surface, accessing the compartments for storage and removal of desired objects, assembling the shower portion to provide showering functions, and easily locking the trailer during periods of non-use.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
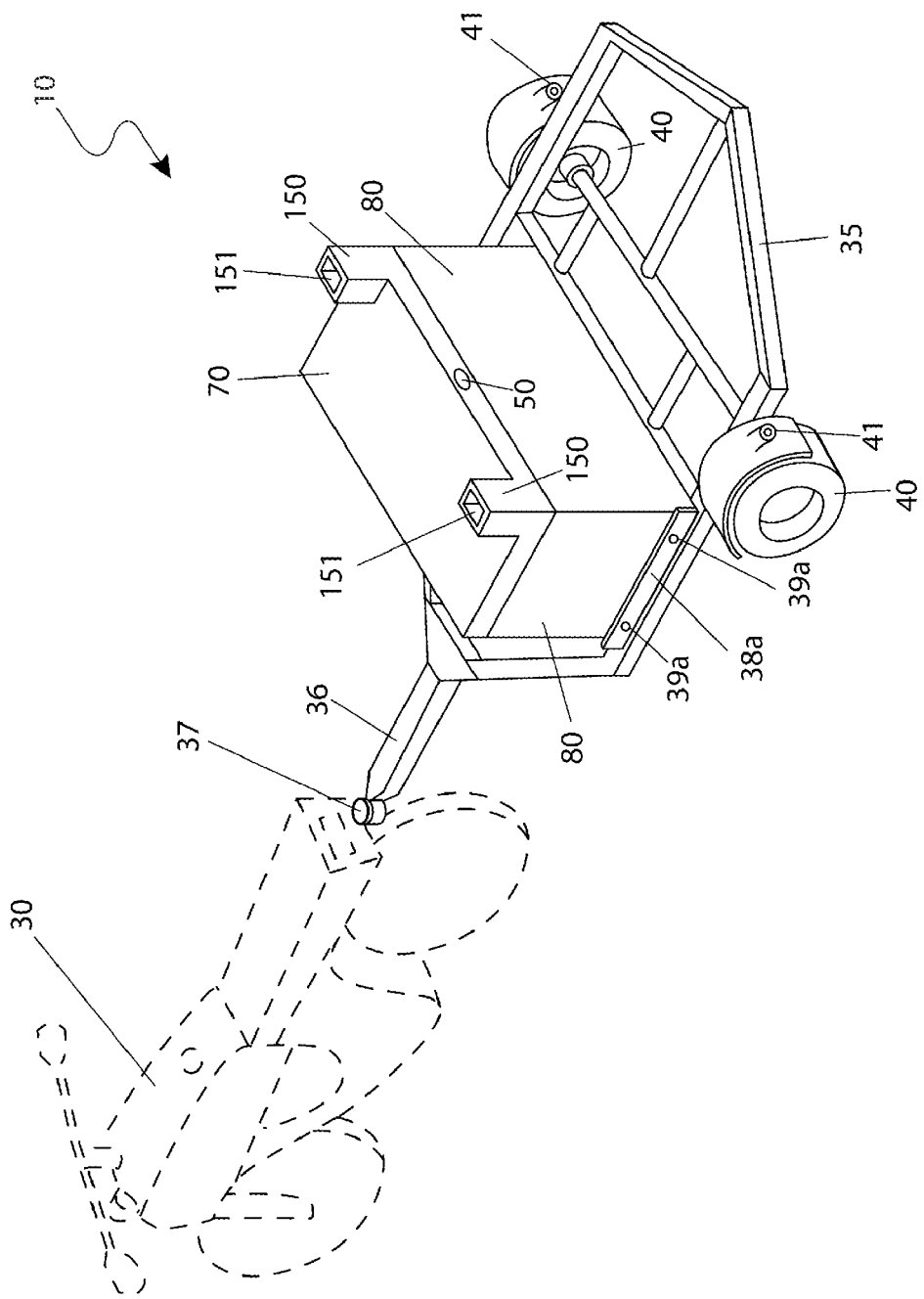
FIG. 1 is an environmental view of a toolbox camper 10 depicting a towing attachment to a motorcycle 30, according to a preferred embodiment of the present invention.

| | |
|---|---|
| 10 | toolbox camper |
| 20 | truck |
| 25 | truck bed |
| 30 | motorcycle |
| 35 | trailer |
| 36 | tongue |
| 37 | hitch |
| 38a | frame extension |
| 38b | frame support |
| 39a | fastener |
| 39b | aperture |
| 40 | wheel |
| 41 | taillight |
| 50 | locking mechanism |
| 60 | grill |
| 63 | grill pivoting means |
| 65 | grill leg |
| 67 | cooking grid |
| 68 | grill recess |

-continued

DESCRIPTIVE KEY

| | |
|---|---|
| 69 | grill lock |
| 70 | top structure |
| 75 | hinge |
| 80 | base structure |
| 90 | mattress |
| 95 | bed leg |
| 100 | support arm |
| 105 | support member |
| 109 | mattress section |
| 110 | first compartment |
| 115 | first compartment lid |
| 116 | first compartment relief |
| 117 | drainage aperture |
| 120 | second compartment |
| 125 | second compartment lid |
| 126 | second compartment relief |
| 130 | pole support member |
| 131 | first extension member |
| 132 | second extension member |
| 133 | upper member |
| 134 | hook |
| 140 | third compartment |
| 145 | third compartment lid |
| 146 | third compartment relief |
| 147 | lid hinge |
| 148 | shower |
| 149 | shower curtain |
| 150 | leg fastener |
| 151 | leg fastener opening |

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a toolbox camper (herein described as the "apparatus") 10, which provides a portable sleeping and storage system for one (1) to two (2) people for use while camping or similar activity. The apparatus 10 comprises a trailer 35 and a base structure 80 which provides for a wheeled camping accessory which further includes a grill 60, a plurality of storage means 110, 120, 140, and a shower 148. The apparatus 10 is fabricated of durable materials such as, but not limited to: aluminum, stainless steel, or the like.

Referring now to FIG. 1, an environmental view of the apparatus 10 depicting a towing attachment to a motorcycle 30, according to the preferred embodiment of the present invention, is disclosed. The apparatus 10 comprises a trailer 35 which provides a means to transport the apparatus 10 via towing behind a motorcycle 30 or other small vehicle. The trailer 35 is detachable from the base structure 80 and comprises a generally rectangular structure further including a pair of wheels 40. The trailer 35 comprises expected features such as a tongue 36 which provides an extension means to a motorcycle 30 and a hitch 37 which provides a securing and attachment means to said motorcycle 30. The hitch 37 may include such towing features such as a tow-ball or a tow pin/jaw hitching device, yet other similar device may be utilized without limiting the scope of the device 10. The trailer 35 also includes a pair of vertical frame extensions 38a which provides a means to attach and detach the base structure 80 (also see FIG. 3). The frame extensions 38a are located on opposing side portions of the trailer 35 and provide a fastening means to the base structure 80. The trailer 35 is preferably sized according to measurements which correspond to state and local highway regulations.

Figure 2:
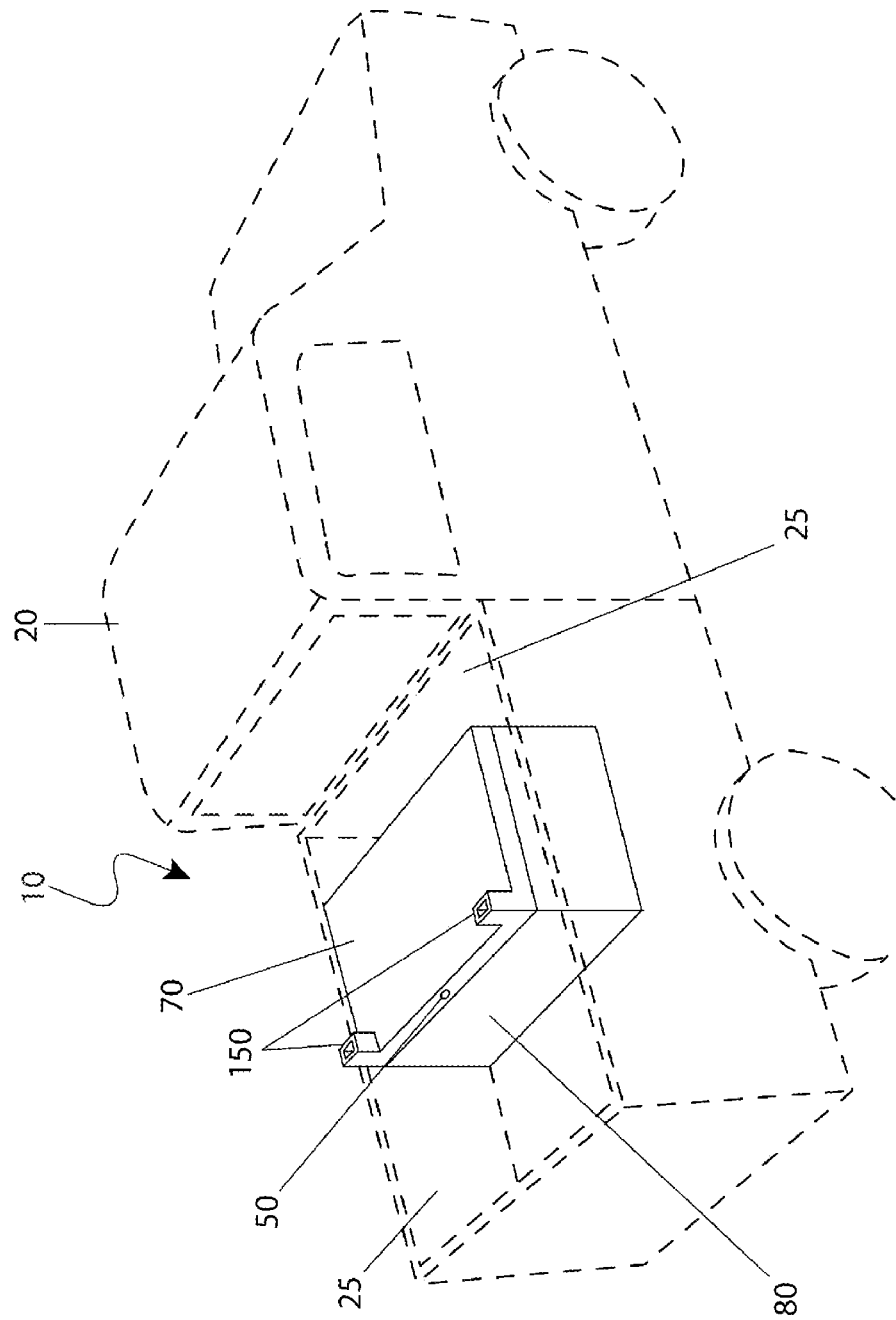
FIG. 2 is another environmental view of the toolbox camper 10 depicting a placement on a truck 20, according to a preferred embodiment of the present invention.

Referring now to FIG. 2, another environmental view of the apparatus 10 depicting a placement upon a truck 20, according to the preferred embodiment of the present invention, is disclosed. The base structure 80 provides a shape similar to the design of conventional truck toolboxes which enables positioning upon a truck bed 25. When positioned upon the truck bed 25 the trailer 35 is removed from the apparatus 10. The base structure 80 of the apparatus 10 freely rests upon the floor of the truck bed 25, yet may be secured to said floor via mechanical fasteners such as, but not limited to: bolts, nuts, and the like. The length of the base structure 80 measures approximately sixty (60) inches and the height measures approximately eighteen (18) inches. The length of the top structure 70 measures approximately seventy (70) inches and the height measures approximately four (4) inches.

Figure 3:
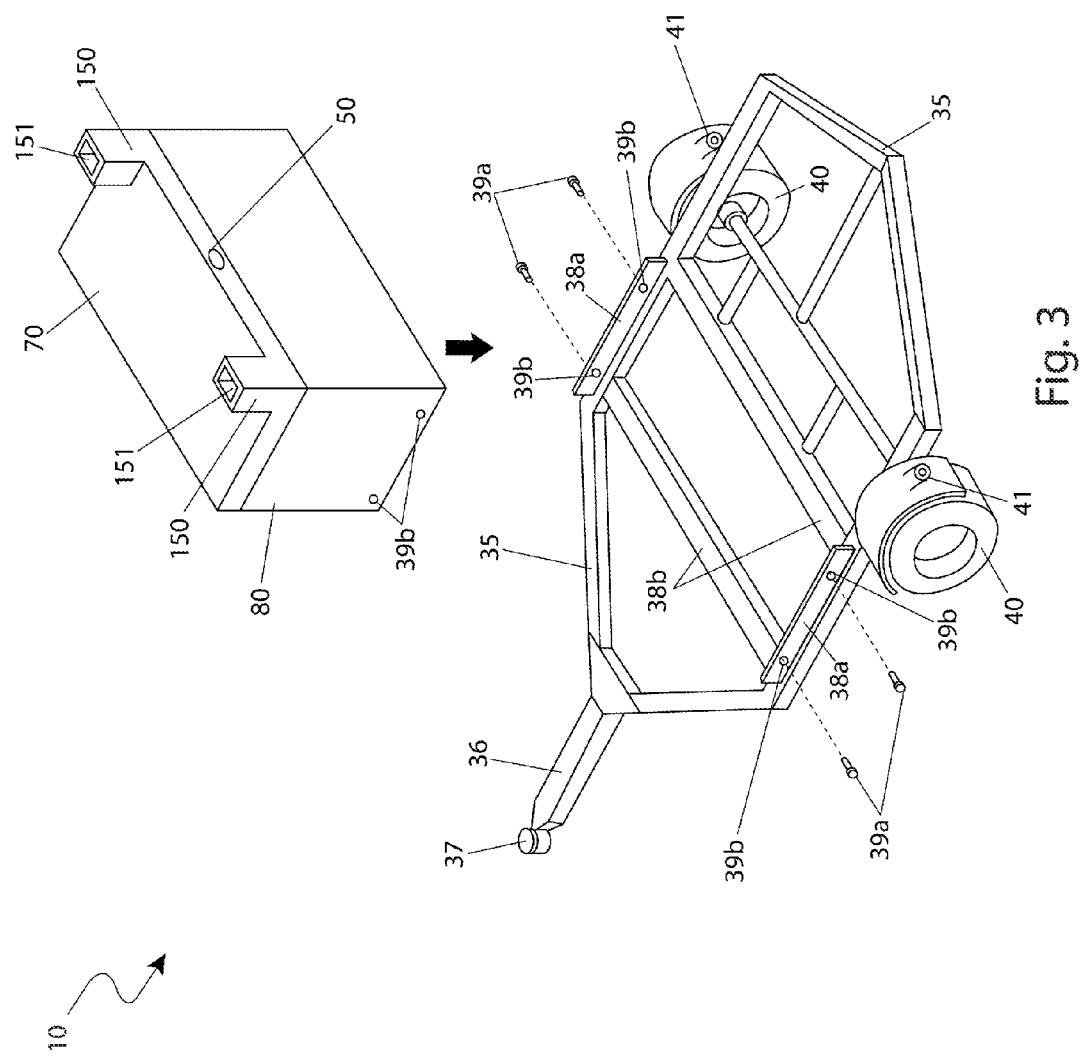
FIG. 3 is an exploded perspective view of the toolbox camper 10 and trailer 35, according to a preferred embodiment of the present invention.

Referring now to FIG. 3, an exploded perspective view of the apparatus 10, according to the preferred embodiment of the present invention, is disclosed. The trailer 35 is comprised of square stock steel tubing which also comprises a pair of frame supports 38b which provides a supporting feature to the base structure 80. The frame supports 38b are oriented perpendicular to the tongue 36 and are preferably attached to an inner surface of the trailer 35 via common welding techniques. The base structure 80 is positioned superjacent to each frame support 38b which retains said base structure 80. As abovementioned the frame extensions 38a provide a means to secure and attach or unsecure and detach the base structure 80 from the trailer 35 via mechanical fasteners 39a. The fasteners 39a are inserted through apertures 39b located on the frame extension 38a and lower side surfaces of the base structure 80.

The trailer 35 also includes expected electrical connections to devices such as taillights 41 which enable a user to translate upcoming driving routes to other drivers or pedestrians. The taillights 41 are depicted herein as being positioned above each wheel 40 for illustration purposes only it is known that other locations may be utilized without limiting the scope of the apparatus 10. Each taillight 41 is preferably interconnected via electrical wiring routed along the frame to a wiring harness on the small vehicle or the motorcycle 30 in a common manner.

A top structure 70 is hingedly attached to the base structure 80 to provide a lid to the apparatus 10. The top structure 70 is attached to the base structure 80 via a pair of hinges 75 (see FIG. 5). The top structure 70 further provides a locking mechanism 50 to secure items inside. The locking mechanism 50 secures the top structure 70 to the base structure 80 and is located at an intermediate position on said top structure 70. The locking mechanism 50 is preferably a key lock system which provides security to the apparatus 10 yet other systems may be integrated without limiting the scope of said apparatus 10.

Figure 4:
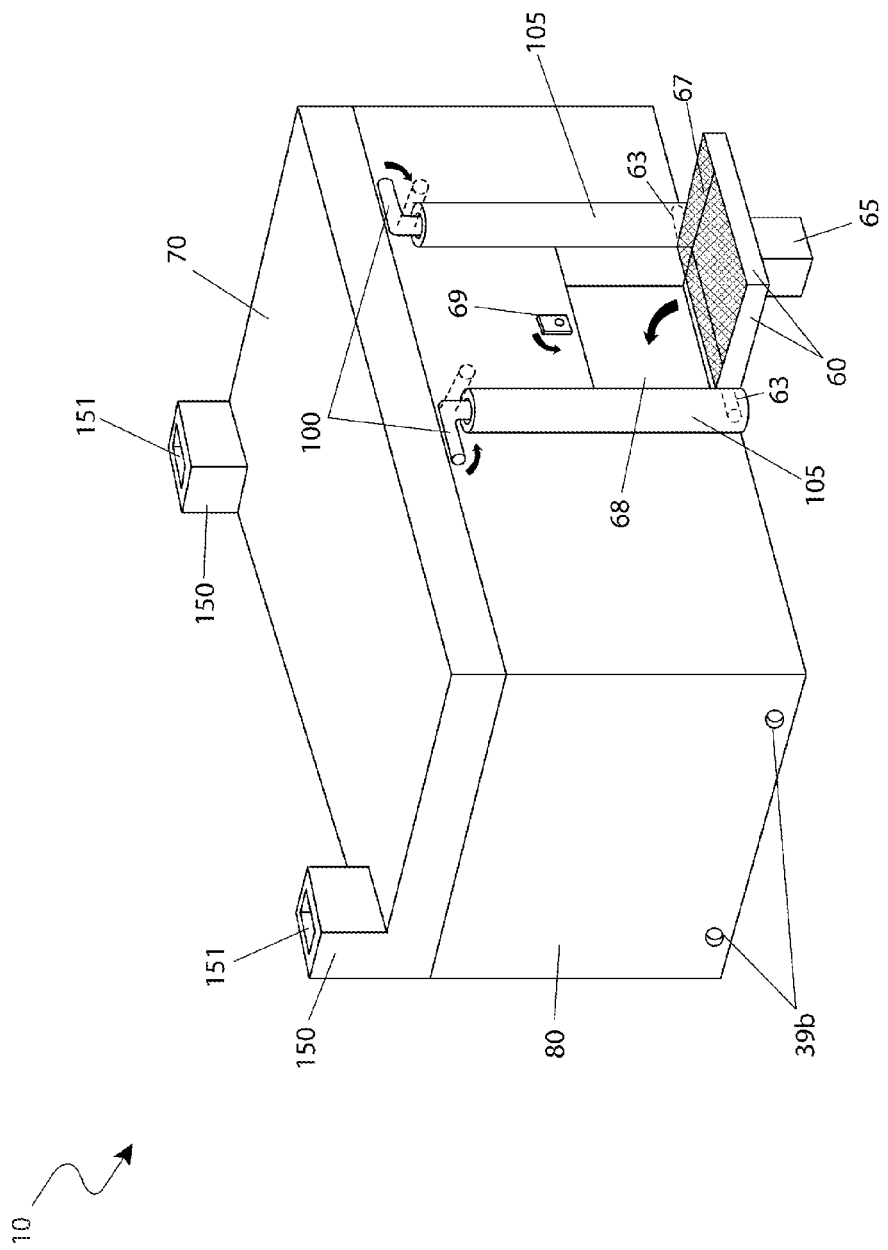
FIG. 4 is a perspective view of the rear portion of the toolbox camper 10, according to a preferred embodiment of the present invention.

Referring now to FIG. 4, a perspective view of the rear portion of the apparatus 10, according to the preferred embodiment of the present invention, is disclosed. For purposes of illustration, the orientation of the apparatus 10, for example, front, rear, and sides, will correspond to a relative position of the truck 20. The apparatus 10 comprises a grill 60 similar to conventional charcoal grills with an inner space to place charcoal or other cooking fuel and a cooking grid 67 for grilling food. The grill 60 is approximately twelve (12) inches wide, twenty (20) inches long, and eight (8) inches deep. The grill 60 includes a pivoting means 63 which enables said grill 60 to be inserted into a grill recess 68 for compact vertical storage. The pivoting means 63 is preferably a pin which creates an axis for the grill 60 to rotate about. The grill 60 also includes a rotatable grill lock 69 which enables said grill 60 to remain in a vertical store position during non-use or transporting of the device 10. The grill lock 69 is preferably a pivoting knob which secures the grill 60. When said grill 60 is rotated to a horizontal position a grill leg 65 provides a vertical securing means. The grill leg 65 is integrally molded and fixed to an underside portion of the grill 60 and provides support while in use. The grill 60 may be fabricated from materials such as, but not limited to: stainless steel, cast iron, or the like.

The apparatus 10 also comprises a pair of support arms 100. The support arms 100 support an upper surface of a top structure 70 of the base structure 80 when folded open into a sleeping position (see FIG. 5). Each support arm 100 includes an "L"-shaped body which rotates inwardly to provide a supporting means to the top structure 70 upon an upper portion of each support arm 100. The support arms 100 are preferably fabricated from a strong durable material to support the weight of the top structure 70 and occupying persons. The support arms 100 are attached to a side surface of the base structure 80 via a pair of support members 105. A support member 105 flanks the grill 60 in a vertical orientation. Each support member 105 comprises an arcuate shape which is integrally molded to the base structure 80 and enables a support arm 100 to rotate within an internal surface.

Figure 5:
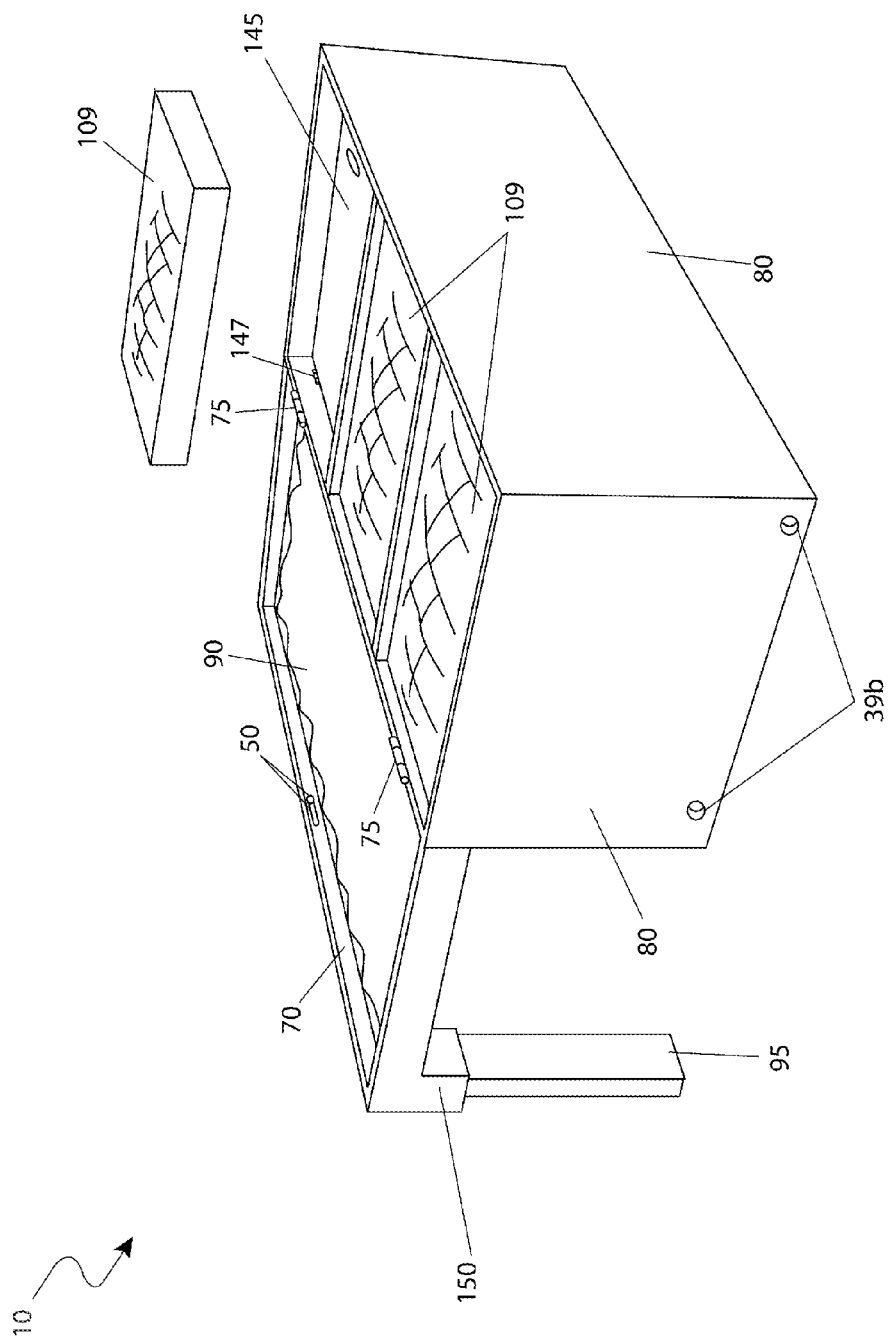
FIG. 5 is a perspective view of the front portion of the toolbox camper 10 depicting an open state, according to a preferred embodiment of the present invention.

Referring now to FIG. 5, a perspective view of the front portion of the apparatus 10 depicting an open state, according to a preferred embodiment of the present invention, is disclosed. Before the top structure 70 of apparatus 10 is folded to an open state via the hinges 75 to the sleeping position, a pair of removably attachable bed legs 95 must be inserted into a pair of leg fasteners 150 via interference fitting. The leg fasteners 150 are comprised of integral rectangular socket-like fixtures located upon an upper surface of the top structure 70. Each leg fastener 150 comprises a leg fastener opening 151 which provides a means to insert a respective bed leg 95. The leg fasteners 150 and bed legs 95 provide a support means to the top structure 70. When not in use, the bed legs 95 can be removed from the leg fasteners 150 and stored in the base structure 80. A strong durable material would be used for the fabrication of the bed legs 95.

The inside portion of the top structure 70 is equipped with a mattress 90 which is unveiled upon the unfolding process which creates a sleeping or sitting surface. The mattress 90 is recessed into the top structure 70 therefore said mattress 90 comprises dimensions equal to the inner dimensions of said top structure 70. The mattress 90 is comprised of a rectangular pad which is packed with soft filler, springs, or the like.

Figure 6:
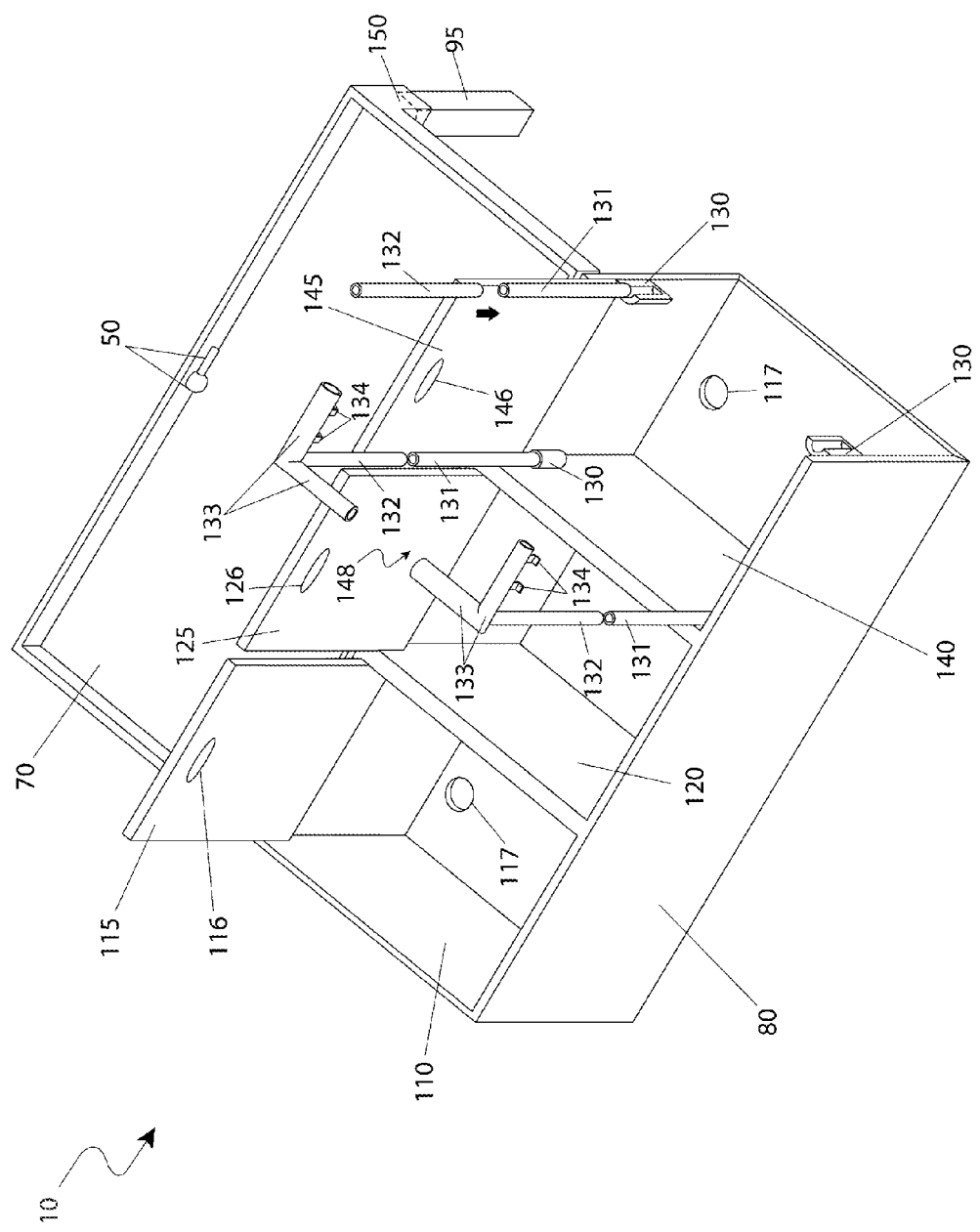
FIG. 6 is another perspective view of the toolbox camper 10 depicting an opened state and an exploded shower 148, according to a preferred embodiment of the present invention; and, FIG. 7 is another perspective view of the toolbox camper 10 depicting an opened state and a deployed shower 148, according to a preferred embodiment of the present invention.

The base structure 80 comprises a first compartment 110, a first compartment lid 115, the second compartment 120, a second compartment lid 125, a shower 146 stored within a third compartment 140, and a third compartment lid 145 which are exposed when the apparatus 10 is configured in an open state (also see FIG. 6). The three (3) compartments 110, 120, 140 are offset from a top edge of the base structure 80 which further provides a means to place up to three (3) mattresses sections 109 and create a second bed or sitting surface. The mattresses sections 109 are comprised of removable pads packed with filler to provide comfort and support to the user and are preferably laid upon each lid 115, 125, 145. Each compartment 110, 120, 140 is equipped with lids 115, 125, 145 for covering said compartments 110, 120, 140 when not in use and to support the mattress sections 109.

Figure 7:
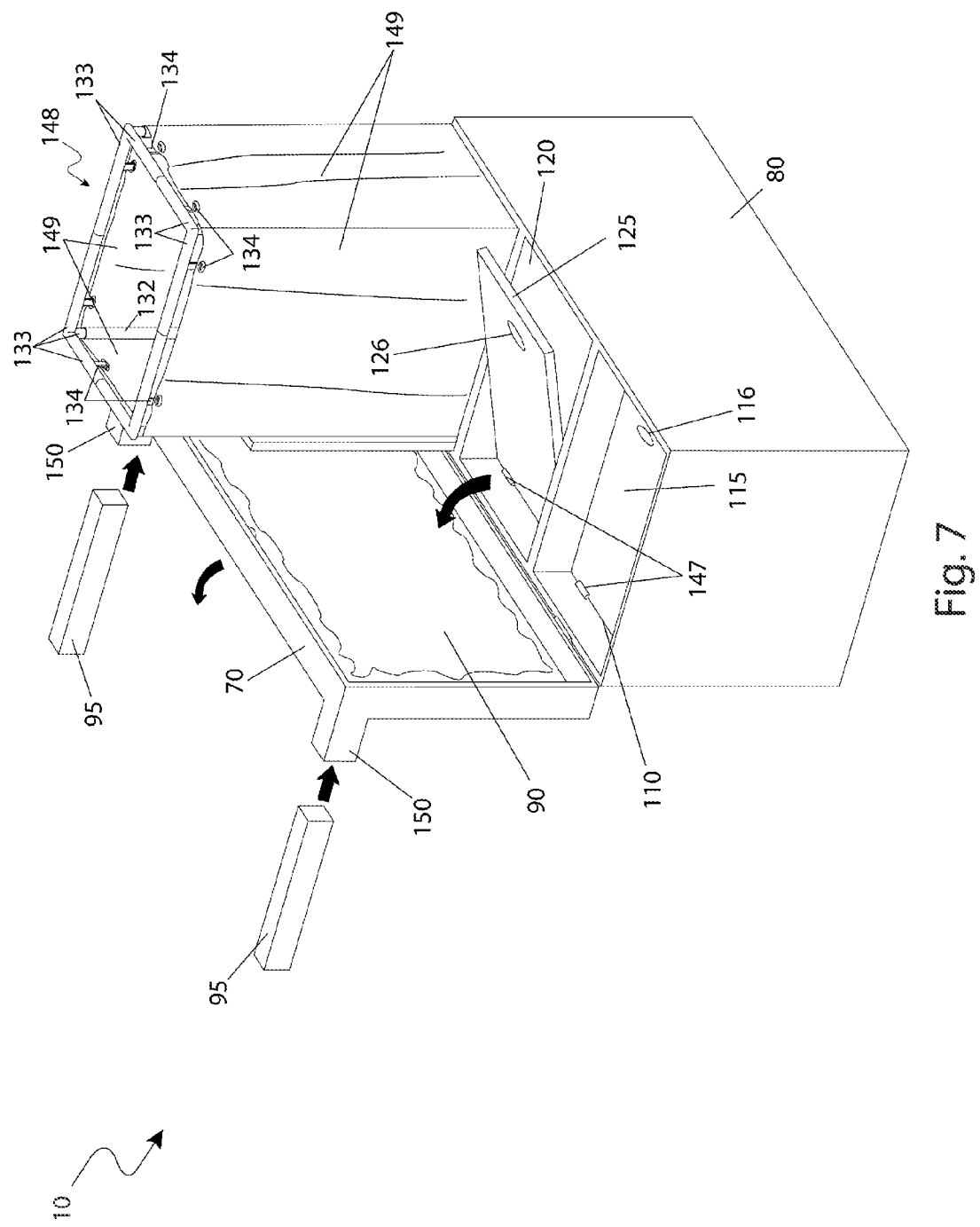

Referring now to FIG. 6, another perspective view of the apparatus 10 depicting an opened state and an exploded shower 148 and FIG. 7, another perspective view of the apparatus 10 depicting an open state and a deployed shower 148, according to a preferred embodiment of the present invention, are disclosed. Each lid 115, 125, 145 is hingedly attached to an internal surface of the base structure 80 via a pair of lid hinges 147 which enable each said lid 115, 125, 145 to rotate ninety degrees (90°). Each lid 115, 125, 145 comprises a respective compartment relief 116, 126, 146 which provides a digit-operated means to manually open a desired compartment 110, 120, 140. The lids 115, 125, 145 are foreseen to be cut to individual compartment 110, 120, 140 dimensions and fabricated from materials such as, but not limited to: wood, metal, plastic or the like.

The first compartment 110 is located on the left side of the base structure 80, yet other locations may be utilized without limiting the scope of the apparatus 10 and is preferably insulated to keep items cool. The cooling and insulating features of the first compartment 110 are accomplished via insulating an internal portion of the first compartment 110 walls with foam and positioning ice pack or bags placed within said first compartment 110. The first compartment 110 also comprises a drain aperture 117 which provides a means to remove unwanted liquid collected in said first compartment 110. The drain aperture 117 may also be plugged when draining is not necessary via a common plug. The first compartment 110 comprises dimensions measuring approximately twenty (20) inches wide and eighteen (18) inches in height.

The second compartment 120 of the base structure 80 comprises a dry storage means to store items such as, but not limited to: clothes, bedding, food, and the like. The second compartment 120 is for keeping the stored items free from any moisture. The second compartment 120 is approximately twenty (20) inches wide and eighteen (18) inches in height. The second compartment 120 is depicted as being located at in intermediate position within the base structure 80 for illustration purposes only; it is known that other locations may be utilized without limiting the scope of the apparatus 10.

The third compartment 140 of the base structure 80 houses a collapsible shower 148. All items needed to create the shower 148 are stored within the third compartment 140. The third compartment 140 is approximately twenty (20) inches wide and eighteen (18) inches in height and is preferably coated in a waterproof material. The third compartment 140 further comprises a drainage aperture 117 to remove unwanted liquid collected in said third compartment 140 when the shower 148 is utilized. The shower 148 incorporates a plastic tubular frame and shower curtain system which houses collapsible poles to be assembled into the third compartment 140.

The assembling of the shower 148 is initiated via inserting a first extension member 131 into a respective pole support member 130 via interference fitting. The apparatus 10 comprises approximately four (4) pole support members 130 which are located on each upper corner within the third compartment 140 and are preferably integrally molded into the inner side surfaces of said third compartment 140. The pole support members 130 each comprise a tubular shape with an open upper surface and a closed bottom surface which enables the first extension members 131 to be inserted and secured within said pole support members 130 in an upright orientation. The diameter of the first extension members 131 is slightly smaller than the diameter of the pole support members 130 which enables said first extension members 131 to slidably engage the inner surfaces of the pole support members 130. Next, a second extension member 132 is inserted into an upper surface of each first extension member 131 via interference fitting. The diameter of the second extension members 132 is slightly smaller than the diameter of the first extension members 131 to enable said second extension members 132 to slidably engage the inner surfaces of said first extension members 131. The second extension members 132 provide additional height to the shower 148 and provide an attachment means to upper members 133. The upper members 133 are comprised of right angled members who interconnect to each other and to each second extension member 133, thereby providing a supporting structure to a show curtain 149. The upper members 133 interconnect to each other and to each second extension member 132 via interference fitting. Each upper member 133 comprises approximately four (4) hooks 134 which provide a means to suspend the shower curtain 149 in a common manner. The shower 148 uses a conventional shower water bag used for camping which is suspended from one (1) of the hooks 134 as desired. The shower curtain 149 is preferably draped within the third compartment 140 as to prohibit water from wetting the rest of the apparatus 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The preferred embodiment of the present invention can be utilized by the common user in a simple and effortless manner with little or no training. After initial purchase or acquisition of the apparatus 10, it would be installed as indicated in FIG. 1 through FIG. 7.

The method of utilizing the apparatus 10 may be achieved by performing the following steps: acquiring the apparatus 10; placing the apparatus 10 on a level hard surface; unlocking the locking mechanism 50; rotating the support arms 100 inward; pivoting the top structure 70 and resting it on said support arms 100; inserting the bed legs 95 in the leg fasteners 150; placing mattress sections 109 upon the lid portions 115, 125, 145 of the base structure 80; and, utilizing the apparatus 10 as is or uncovering the compartments 110, 120, 140 as needed.

If operating the shower 146 is desired the following steps are preformed: inserting the first extension members 131 into each pole support member 130; inserting the second extension members 132 into each first extension member 131; inserting the upper members 133 into each second extension member 132; fastening a shower curtain 149 and water bag upon the hooks 134; using the shower 146 in a normal manner; draining excess water via the drainage aperture 117; unfastening the shower curtain 149 and water bag as desired; and, disassembling the shower 148 as desired.

If the compartments 110, 120, 140 or bed 90 are not needed, the grill 60 may be used by performing the following steps: unlatching and pivoting the grill 60 to a horizontal position via the grill lock 69; unfolding the grill 60 and enabling the grill leg 65 to provide a vertical support; placing charcoal or other cooking fuel in the grill 60 and cooking as needed; cleaning the grill 60 as desired after cooling; and, securing grill 60 to a secure stowed position via the grill lock 69.

When using the apparatus 10 upon a truck bed 25 (see FIG. 2) the following steps are performed: removing the trailer 34 from the base structure 80 via unfastening the fasteners 39a from the frame extension 38a; lifting the base structure 80 onto a truck bed 25; positioning the apparatus 10 to the middle of the truck bed 25; driving to a destination; following the steps described above to utilize the bed 90, compartments 110, 120, 140, shower 146, or grill 60 as described; and, locking the locking mechanism 50 when finished.

When using the apparatus 10 attached to a motorcycle 30 or small vehicle (see FIG. 1) the following steps are performed: attaching the base structure 80 to the trailer 35 if not previously installed via positioning the base structure 80 upon the frame supports 38b and inserting fasteners 39a into the apertures 39b upon the frame extensions 38a and base structure 80; securing the apparatus 10 to the motorcycle 30 or small vehicle by means of the hitch 37; driving to a destination; following the steps described above to utilize the bed 90, compartments 110, 120, 140, shower 146, or grill 60 as needed; and, locking the locking mechanism 50 when finished.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A convertible toolbox, comprising:
   a base assembly, comprising a plurality of compartments therewithin;
   a grill deployable from a grill recess portion of said base assembly;
   a shower assembly removably attachable to said base assembly;
   wherein said shower assembly is removably stored within at least one of said plurality of compartments; and,
   wherein said toolbox is convertible to a camper configuration.

2. The convertible toolbox of claim 1, wherein said base assembly further comprises:
   a five-sided enclosure further comprising a lid having a first side hingedly attached to an upper perimeter edge of a first side of said enclosure, said lid comprising an inner side and an outer side;
   a locking mechanism securing a second side of said lid to an upper portion of a second side of said enclosure;
   a mattress recessed within said inner side of said lid;
   a pair of leg fastener openings located on opposing corners of said second side of said outer side of said lid;
   a pair of legs each removably attached to one of said pair of leg fastener opening;
   a pair of support members monolithically formed with said first side of said enclosure adjacent to said grill recess portion, further comprising a semi-arcuate receiving member coextensive with a height of said first side;
   a pair of support arms each attached to one of said pair of support members and rotatably positioned between a stored position and a deployed position, further comprising an "L"-shaped body;
   wherein when said lid is in a fully opened position, said convertible toolbox is converted to said camper configuration;
   wherein when said pair of legs are inserted in to said pair of leg fastener openings, said pair of legs supports said lid when fully opened into said camper configuration;
   wherein said pair of legs are removably stored within at least one of said plurality of compartments;
   wherein when said pair of support arms are rotated to a deployed position, said pair of support arms supports said lid when fully opened into said camper configuration;
   wherein said plurality of compartments are subdivided by a plurality of walls upstanding from an interior surface of said enclosure;
   wherein said lid provides access to each of said plurality of compartments; and,
   wherein said locking mechanism prevents unauthorized access to said plurality of compartments.

3. The convertible toolbox of claim 2, wherein said grill assembly further comprises:
   a cooking box having a cooking side and a bottom side, said cooking box pivotally connected to opposing inner sides of said grill recess portion;
   a grill leg monolithically formed on a central location of said bottom side;
   a grill grate removably placed on an upper portion of said cooking side spanning an upper perimeter area thereof, thereby providing an area subjacent to said grill grate for cooking fuel to reside therein; and,
   a grill locking mechanism for retaining said cooking box within said grill recess portion when not deployed;
   wherein said bottom side of said grill assembly is flush with said first side of said enclosure when within said grill recess portion;
   wherein said grill leg supports said coming box when deployed; and,
   wherein said cooking box is laterally maintained when fully deployed.

4. The convertible toolbox of claim 3, wherein said plurality of compartments further comprise:
   a first compartment, comprising a first compartment lid hingedly attached to an inner surface of said first side of said enclosure between a fully closed and a fully open position;
   a second compartment adjacent to said first compartment, comprising a second compartment lid hingedly attached to an inner surface of said first side of said enclosure between a fully closed and a fully open position;
   a third compartment adjacent to said second compartment, comprising a third compartment lid hingedly attached to an inner surface of said first side of said enclosure between a fully closed and a fully open position; and,
   three mattress sections each placed on each of said first compartment lid, said second compartment lid, and said third compartment lid when each are in said fully closed position;
   wherein said first compartment lid provides access to said first compartment;

wherein said second compartment lid provides access to said second compartment;
wherein said third compartment lid provides access to said third compartment;
wherein each of said first compartment lid, said second compartment lid, and said third compartment lid are hingedly attached at a common offset distance from an upper perimeter edge of said enclosure.

5. The convertible toolbox of claim 4, wherein said first compartment further comprises:
   internal walls facing said first compartment further comprising insulation; and,
   a first drain aperture with a removable drain plug located on a bottom wall of said first compartment;
   wherein said first compartment provides a cold storage means for inserted items therein.

6. The convertible toolbox of claim 4, wherein said second compartment further comprises a dry storage means for inserted items therein.

7. The convertible toolbox of claim 4, wherein said third compartment further comprises:
   interior wall portions further comprising a waterproof material;
   four pole support members each monolithically formed with said interior wall portion of said third compartment subjacent to said third compartment lid, each further comprising a tubular member with an open upper surface and a closed bottom surface; and,
   a second drain aperture with a removable drain plug located on a bottom wall of said third compartment;
   wherein said shower assembly in stored within said third compartment; and,
   wherein each of said pole support members receive and support said shower assembly.

8. The convertible toolbox of claim 4, further comprising dimension enabling placement within a bed of a truck.

9. The convertible toolbox of claim 8, wherein said enclosure further comprises:
   said base assembly further comprising a length of approximately sixty inches and a height of approximately eighteen inches;
   said lid comprising a length of approximately seventy inches and a height of approximately four inches;
   said first compartment, said second compartment, and said third compartment each comprising a width of approximately twenty inches and a height of approximately eighteen inches.

10. The convertible toolbox of claim 7, wherein said shower assembly further comprises:
    four tubular elongated first extension members;
    four tubular elongated second extension members each removably inserted within one of said four first extension members;
    four tubular upper members, each further comprising a vertical member and two horizontal members disposed at right angles, each of said vertical members are removably inserted into one of said four second extension members;
    a plurality of hooks suspended from said horizontal members of said upper members; and,
    a shower curtain, comprising a waterproof flexible and resilient sheet and further comprising a plurality of horizontally aligned reinforced grommets located at an upper portion, each sized to accommodate each of said plurality of hooks;
    wherein each of four tubular extension members are inserted into one of said four support members;
    wherein a continuous upper frame support is produced when said four upper members are interconnected; and,
    wherein said shower curtain provides a privacy enclosure to an interior of said third compartment when suspended from said plurality of hooks.

11. A convertible toolbox, comprising:
    a base assembly, comprising a plurality of compartments therewithin;
    a grill deployable from a grill recess portion of said base assembly;
    a shower assembly removably attachable to said base assembly; and,
    a trailer assembly for removably receiving and supporting said base assembly;
    wherein said shower assembly is removably stored within at least one of said plurality of compartments;
    wherein said toolbox is convertible to a camper configuration; and,
    wherein said trailer assembly is removably attached to a towing vehicle.

12. The convertible toolbox of claim 11, wherein said base assembly further comprises:
    a five-sided enclosure further comprising a lid having a first side hingedly attached to an upper perimeter edge of a first side of said enclosure, said lid comprising an inner side and an outer side;
    a locking mechanism securing a second side of said lid to an upper portion of a second side of said enclosure;
    a mattress recessed within said inner side of said lid;
    a pair of leg fastener openings located on opposing corners of said second side of said outer side of said lid;
    a pair of legs each removably attached to one of said pair of leg fastener opening;
    a pair of support members monolithically formed with said first side of said enclosure adjacent to said grill recess portion, further comprising a semi-arcuate receiving member coextensive with a height of said first side;
    a pair of support arms each attached to one of said pair of support members and rotatably positioned between a stored position and a deployed position, further comprising an "L"-shaped body;
    wherein when said lid is in a fully opened position, said convertible toolbox is converted to said camper configuration;
    wherein when said pair of legs are inserted in to said pair of leg fastener openings, said pair of legs supports said lid when fully opened into said camper configuration;
    wherein said pair of legs are removably stored within at least one of said plurality of compartments;
    wherein when said pair of support arms are rotated to a deployed position, said pair of support arms supports said lid when fully opened into said camper configuration;
    wherein said plurality of compartments are subdivided by a plurality of walls upstanding from an interior surface of said enclosure;
    wherein said lid provides access to each of said plurality of compartments; and,
    wherein said locking mechanism prevents unauthorized access to said plurality of compartments.

13. The convertible toolbox of claim 12, wherein said grill assembly further comprises:
    a cooking box having a cooking side and a bottom side, said cooking box pivotally connected to opposing inner sides of said grill recess portion;
    a grill leg monolithically formed on a central location of said bottom side;

a grill grate removably placed on an upper portion of said cooking side spanning an upper perimeter area thereof, thereby providing an area subjacent to said grill grate for cooking fuel to reside therein; and, a grill locking mechanism for retaining said cooking box within said grill recess portion when not deployed;

wherein said bottom side of said grill assembly is flush with said first side of said enclosure when within said grill recess portion;

wherein said grill leg supports said coming box when deployed; and, wherein said cooking box is laterally maintained when fully deployed.

14. The convertible toolbox of claim 13, wherein said plurality of compartments further comprise:

a first compartment, comprising a first compartment lid hingedly attached to an inner surface of said first side of said enclosure between a fully closed and a fully open position;

a second compartment adjacent to said first compartment, comprising a second compartment lid hingedly attached to an inner surface of said first side of said enclosure between a fully closed and a fully open position;

a third compartment adjacent to said second compartment, comprising a third compartment lid hingedly attached to an inner surface of said first side of said enclosure between a fully closed and a fully open position; and, three mattress sections each placed on each of said first compartment lid, said second compartment lid, and said third compartment lid when each are in said fully closed position;

wherein said first compartment lid provides access to said first compartment;

wherein said second compartment lid provides access to said second compartment;

wherein said third compartment lid provides access to said third compartment;

wherein each of said first compartment lid, said second compartment lid, and said third compartment lid are hingedly attached at a common offset distance from an upper perimeter edge of said enclosure.

15. The convertible toolbox of claim 14, wherein said first compartment further comprises:

internal walls facing said first compartment further comprising insulation; and, a first drain aperture with a removable drain plug located on a bottom wall of said first compartment;

wherein said first compartment provides a cold storage means for inserted items therein.

16. The convertible toolbox of claim 14 wherein said second compartment further comprises a dry storage means for inserted items therein.

17. The convertible toolbox of claim 14, wherein said third compartment further comprises:

interior wall portions further comprising a waterproof material;

four pole support members each monolithically formed with said interior wall portion of said third compartment subjacent to said third compartment lid, each further comprising a tubular member with an open upper surface and a closed bottom surface; and, a second drain aperture with a removable drain plug located on a bottom wall of said third compartment;

wherein said shower assembly in stored within said third compartment; and, wherein each of said pole support members receive and support said shower assembly.

18. The convertible toolbox of claim 14, wherein said enclosure further comprises:

said base assembly further comprising a length of approximately sixty inches and a height of approximately eighteen inches;

said lid comprising a length of approximately seventy inches and a height of approximately four inches;

said first compartment, said second compartment, and said third compartment each comprising a width of approximately twenty inches and a height of approximately eighteen inches.

19. The convertible toolbox of claim 17, wherein said shower assembly further comprises:

four tubular elongated first extension members;

four tubular elongated second extension members each removably inserted within one of said four first extension members;

four tubular upper members, each further comprising a vertical member and two horizontal members disposed at right angles, each of said vertical members are removably inserted into one of said four second extension members;

a plurality of hooks suspended from said horizontal members of said upper members; and, a shower curtain, comprising a waterproof flexible and resilient sheet and further comprising a plurality of horizontally aligned reinforced grommets located at an upper portion, each sized to accommodate each of said plurality of hooks;

wherein each of four tubular extension members are inserted into one of said four support members;

wherein a continuous upper frame support is produced when said four upper members are interconnected; and, wherein said shower curtain provides a privacy enclosure to an interior of said third compartment when suspended from said plurality of hooks.

20. The convertible toolbox of claim 12, wherein said trailer assembly further comprises:

a trailer frame comprising a plurality of frame members affixed together to provide a rigid and resilient frame, further comprising a tongue and a hitch extending outwardly from a from a front portion, thereby removably attached to said towing vehicle;

a pair of frame supports located on said front portion rearward of and perpendicular to said tongue and spanning a distance between opposing frame members, said pair of frame supports defining a frame support width therebetween;

a pair of frame extensions upwardly affixed to said opposing frame members and having a width extending at least to said frame support width;

a pair of wheel assemblies attached to a rear portion of said trailer frame, comprising a pair of wheels interconnected with an axle attached to said frame, and a bumper attached to said frame superjacent to each of said wheels; and, a pair of taillights positioned on a rearward location of each of said bumpers in electrical communication with said towing vehicle;

wherein said base assembly is placed on said pair of frame supports; and, wherein said base assembly is secured to said pair of frame extensions with a plurality of fasteners.

* * * * *